US012752296B2

(12) United States Patent
Ha et al.

(10) Patent No.: US 12,752,296 B2
(45) Date of Patent: Oct. 6, 2026

(54) SUBSTRATE PROCESSING DEVICE AND CONTROL METHOD FOR SUBSTRATE PROCESSING DEVICE

(71) Applicant: SEMES CO., LTD., Cheonan-si (KR)

(72) Inventors: Sang Min Ha, Hwaseong-si (KR); Hyeong Jun Cho, Seoul (KR); Jae Hong Kim, Anyang-si (KR); Sang Hyun Son, Busan (KR); Young-Joo Seo, Gwangju-si (KR)

(73) Assignee: Semes Co., Ltd., Chungcheongnam-do (KR)

( * ) Notice: Subject to any disclaimer, the term of this patent is extended or adjusted under 35 U.S.C. 154(b) by 952 days.

(21) Appl. No.: 18/147,353

(22) Filed: Dec. 28, 2022

(65) Prior Publication Data

US 2023/0201860 A1 Jun. 29, 2023

(30) Foreign Application Priority Data

Dec. 29, 2021 (KR) ........................ 10-2021-0191462
Oct. 4, 2022 (KR) ........................ 10-2022-0126628

(51) Int. Cl.
*B05C 5/02* (2006.01)

(52) U.S. Cl.
CPC .......... *B05C 5/0225* (2013.01); *B05C 5/0291* (2013.01)

(58) Field of Classification Search
None
See application file for complete search history.

(56) References Cited

U.S. PATENT DOCUMENTS

| | | | | |
|---|---|---|---|---|
| 4,369,455 A * | 1/1983 | McConica | B41J 2/04581 310/317 |
| 8,251,475 B2 * | 8/2012 | Murray | B41J 11/0065 347/14 |
| 9,381,740 B2 * | 7/2016 | Hoisington | B41J 2/04581 |
| 11,071,996 B2 * | 7/2021 | Ikushima | B05C 11/1034 |
| 12,145,333 B2 * | 11/2024 | Hyun | H10K 71/611 |
| 12,240,259 B2 * | 3/2025 | Ha | B41J 29/393 |
| 12,291,029 B2 * | 5/2025 | Kim | B41M 5/0047 |
| 12,447,739 B2 * | 10/2025 | Jin | G02B 27/0025 |
| 12,466,206 B2 * | 11/2025 | Oh | B41J 29/393 |
| 12,472,739 B2 * | 11/2025 | Jin | B41J 2/125 |
| 2006/0109296 A1 * | 5/2006 | Shamoun | B41J 3/543 347/20 |
| 2008/0080013 A1 * | 4/2008 | Akiyama | H04N 1/053 358/410 |
| 2013/0083108 A1 * | 4/2013 | Sanada | B41J 19/205 347/10 |
| 2015/0191010 A1 | 7/2015 | Yamagata | |

(Continued)

FOREIGN PATENT DOCUMENTS

| | | | |
|---|---|---|---|
| JP | 2000-033739 A | 2/2000 | |
| JP | 2001-359292 A * | 12/2001 | B41J 2/01 |

(Continued)

*Primary Examiner* — Jethro M. Pence
(74) *Attorney, Agent, or Firm* — Harness, Dickey & Pierce, P.L.C.

(57) ABSTRACT

The present invention provides a substrate processing device. An aspect of the present disclosure is to a substrate processing device and a control method for substrate processing device which can improve a resolution of a printer by determining a discharge time of an ink discharge controller with a higher resolution than a pulse wave generated by an encoder.

10 Claims, 3 Drawing Sheets

(56) References Cited

U.S. PATENT DOCUMENTS

| | | | | |
|---|---|---|---|---|
| 2017/0253028 | A1* | 9/2017 | Nishimura | B41J 2/04541 |
| 2024/0299971 | A1* | 9/2024 | Suzuki | H01L 21/6715 |
| 2024/0326406 | A1* | 10/2024 | Jeong | B41J 2/04581 |
| 2025/0262869 | A1* | 8/2025 | Qiu | B41J 3/28 |

FOREIGN PATENT DOCUMENTS

| | | | | | |
|---|---|---|---|---|---|
| JP | 2007-098854 | A | * | 4/2007 | B41J 2/045 |
| JP | 5551669 | B2 | | 7/2014 | |
| JP | 2015-128825 | A | | 7/2015 | |
| JP | 6286671 | B2 | | 3/2018 | |

* cited by examiner

SUBSTRATE PROCESSING DEVICE AND CONTROL METHOD FOR SUBSTRATE PROCESSING DEVICE

CROSS-REFERENCE TO RELATED APPLICATIONS

This application claims priority to and the benefit of Korean Patent Application Nos. 10-2021-0191462 and 10-2022-0126628 filed in the Korean Intellectual Property Office on Dec. 29, 2021, and Oct. 4, 2022 the entire contents of each of which are incorporated herein by reference.

TECHNICAL FIELD

The present invention relates to a substrate processing device, and more particularly, to a substrate processing device for jetting ink to a substrate and printing the substrate and a control method for substrate processing device.

BACKGROUND ART

Among display manufacturing facilities, there is a jetting system that jets a chemical ink such as an aligning film into glass.

Such a jetting system drives a nozzle of a head in a piezo manner while moving an inkjet head and a discharge module transfer device on a two-dimensional plane to jet ink to a display glass.

In this case, in the jetting system, when dividing an X-axis a Y-axis on a two-dimensional plane, in a state where a transfer object where the ink will be applied to a lower transfer base thereof is transferred by a certain distance to the X-axis, ink is applied while a discharge module transfer device disposed on the transfer object and coupled to an ink discharge module moves along the Y-axis, and after the application is completed, the ink is printed on the whole upper surface of the transfer object by repeatedly performing the process of moving the transfer object to be applied again to the X-axis by a certain distance and then transferring the discharge module transfer device back to the Y-axis.

In this case, the jetting system receives pulse waves through an encoder to determine when the ink is jetted. The encoder generates the pulse waves at specific moving intervals of the discharge module transfer device, and an ink discharge controller receives the pulse waves. The ink discharge controller receiving the pulse waves checks a position of the discharge module transfer device based on the number of received pulse waves and then discharges the ink.

If the resolution is set to 100 nm, the encoder generates one pulse wave signal when the discharge module transfer device moves 100 nm. In this case, the ink discharge controller confirms that the discharge module transfer device moves 100 nm, and based on this matter, various control drives such as PID control of the discharge module transfer device are performed. In this case, the ink discharge controller determines that the discharge module transfer device has moved 100 nm for one pulse wave signal, and jets ink when a corresponding area belongs to a position where the ink should be jetted.

In this case, the jetting system jets ink while the discharge module transfer device continuously moves. At this time, in the case where the resolution of encoder is 100 nm, when the discharge module transfer device moves in units of 20 um, the jetting system can count about 200 pulse waves and recognize the jetting position.

Since the conventional jetting system had low printing resolution and had sufficient production time, a method of applying ink by connecting a plurality of ink discharge controllers in a daisy chain way was usually used.

Recently, however, efforts have been made to maximally shorten the production time, resulting in a delay in a signal due to the difference in cable length. In order to solve this problem, the ink discharge controller has used a way of setting an output timing of a signal splitter to have the same time delay even when the lengths of cables are different.

However, since such a setting way to adjust the time delay of the signal splitter does not provide a direct technology to improve the resolution of a printer, there is need for a fundamental technical solution to improve the resolution of the printer.

On the other hand, the encoder generates the pulse waves periodically, and since the pulse waves output from the encoder are omitted or overlapped due to various variables in an input/output section, a control time of the ink discharge controller may be changed.

SUMMARY OF THE INVENTION

The present invention has been made in an effort to provide a substrate processing device and a control method for substrate processing device which can improve a resolution of a printer by determining a discharge time of an ink discharge controller with a higher resolution than a pulse wave generated by an encoder.

The present invention has also been made in an effort to provide a substrate processing device and a control method for substrate processing device which can secure a normal ink discharge timing even when a pulse wave of an encoder input to the ink discharge controller is omitted or overlapped.

The object of the present invention is not limited thereto, and other objects not mentioned will be clearly understood by those of ordinary skill in the art from the following description.

An exemplary embodiment of the present invention provides substrate processing device, comprising: a substrate transfer portion in which a transfer object is seated; and a jetting system including an ink jetting body configured to jet ink to the transfer object from an upper surface of the substrate transfer portion and print the transfer object, an ink module transfer portion configured to transfer the ink jetting body, an ink discharge controller configured to control a ink jetting timing of the ink jetting body by interlocking the ink jetting body, a speed measuring portion configured to specify a moving speed of the ink jetting body, and a signal splitter configured to receive the moving speed of the ink jet jetting body by interlocking the speed measuring portion and transmit a predictive movement signal predicted according to the moving speed to the ink discharge controller.

According to the exemplary embodiment, the jetting system may further include an encoder disposed around the ink module transfer portion and configured to output a movement signal for each unit movement distance of the ink module transfer portion.

According to the exemplary embodiment, the signal splitter may use a speed profile for a movement of the ink jetting body and a predictive pulse wave profile configured so as to generate a predictive pulse wave predicted according to the speed of the speed profile.

According to the exemplary embodiment, the speed profile may be divided into an equivalent acceleration section and an equivalent speed section, and in the equivalent speed section, the predictive pulse waves at the same intervals may be transmitted to the ink discharge controller.

According to the exemplary embodiment, in the equivalent acceleration section, the predictive pulse wave whose interval narrows in proportion to a slope of the equivalent acceleration section may be transmitted to the ink discharge controller.

According to the exemplary embodiment, a plurality of ink jetting bodies and a plurality of ink discharge controllers may be interlocked to jet ink, and the signal splitter may output the predictive pulse waves to each of the plurality of ink discharge controllers.

According to the exemplary embodiment, the ink discharge controller may acquire position information of the ink jetting body by counting the number of inputs of the predictive pulse wave.

According to the exemplary embodiment, the ink module transfer portion may include a module base in which the ink jetting body is mounted, an actuator driver configured to transfer the module base in one direction, and an ink module position controller configured to control a jetting position of ink by controlling the actuator driver to move the module base.

According to the exemplary embodiment, the ink module position controller may acquire position information of the module base from the encoder by interlocking the encoder.

According to the exemplary embodiment, the substrate transfer portion may further include a base controller configured to transfer the transfer object according to a predetermined work command.

Another exemplary embodiment of the present invention provides a control method for a substrate processing device comprising: an ink jetting body transfer step of moving an ink jetting body disposed in an upper part of a transfer object by an ink module transfer portion; a speed measurement step of measuring a moving speed of the ink jetting body and converting the moving speed into a digital speed value by a speed measuring portion, and transmits the converted digital speed value to a signal splitter; a signal splitter signal conversion step of generating a predictive movement signal changed in response to the digital speed value by signal splitter; a signal distribution step of outputting and distributing the predictive movement signal from the signal splitter to an ink discharge controller and confirming a position of the ink jetting body based on the predictive movement signal from the ink discharge controller; and an ink discharge control step of adjusted and setting position information of the ink jetting body based on the predictive movement signal from the ink discharge controller, and transmitting a discharge command to jet ink from the ink jetting body when the adjusted position corresponds to an ink jetting position.

According to the exemplary embodiment, in a step before the signal splitter signal conversion step may further include an encoder signal output step of outputting the movement signal from an encoder for each unit movement distance when the ink module transfer portion is moved, and in the signal splitter signal conversion step, a predictive pulse wave may be generated based on an initial value of the movement signal output from the encoder and is transmitted to the ink discharge controller.

According to the exemplary embodiment, in the signal splitter signal conversion step, the signal splitter may use a speed profile for a movement of the ink jetting body and a predictive pulse wave profile configured so as to generate a predictive pulse wave according to the speed of the speed profile.

According to the exemplary embodiment, the speed profile may be divided into an equivalent acceleration section and an equivalent speed section, and in the equivalent speed section, the predictive pulse waves at the same intervals are transmitted to the ink discharge controller.

According to the exemplary embodiment, in the equivalent acceleration section, the predictive pulse wave whose interval narrows in proportion to a slope of the equivalent acceleration section is transmitted to the ink discharge controller.

According to the exemplary embodiment, in the signal distribution step, the predictive movement signal is output to each of a plurality of ink discharge controllers.

According to the exemplary embodiment, the ink module transfer portion may include a module base in which the ink jetting body is mounted, an actuator driver configured to move the module base in one direction, and an ink module position controller configured to control the jetting position of ink by controlling the actuator driver to move the module base.

According to the exemplary embodiment, the ink module position controller may acquire position information of the module base from the encoder from the encoder by interlocking the encoder.

According to the exemplary embodiment, a step before the ink jetting body transfer step may further include a transfer object transfer step in which the transfer object seated on a substrate transfer portion is transferred by a predetermined command of a base controller and is placed in a specific position in the middle of a lower part of the ink jetting body.

Still another exemplary embodiment of the present invention provides a substrate processing device, comprising: a substrate transfer portion in which a transfer object is seated, and a jetting system including an ink jetting body configured to jet ink to the transfer object from an upper surface of the substrate transfer portion and print the transfer object, an ink module transfer portion configured to transfer the ink jetting body, an ink discharge controller configured to control a ink jetting timing of the ink jetting body by interlocking the ink jetting body, a speed measuring portion configured to specify a moving speed of the ink jetting body, and a signal splitter configured to receive the moving speed of the ink jet jetting body by interlocking the speed measuring portion and transmit a predictive movement signal predicted according to the moving speed to the ink discharge controller, and the jetting system further includes an encoder disposed around the ink module transfer portion and configured to output a movement signal for each unit movement distance of the ink module transfer portion, the signal splitter generates a predictive pulse wave based on an initial value of the movement signal output from the encoder and transmits the predictive pulse wave to the ink discharge controller, the signal splitter uses a speed profile for a movement of the ink jetting body and a predictive pulse wave profile configured so as to generate a predictive pulse wave according to the speed of the speed profile, the speed profile is divided into an equivalent acceleration section and an equivalent speed section, and in the equivalent speed section, the predictive pulse waves at the same intervals are transmitted to the ink discharge controller, in the equivalent acceleration section, the predictive pulse wave whose interval narrows in proportion to a slope of the equivalent acceleration section is transmitted to the ink discharge controller, a plurality of ink jetting bodies and a plurality of ink discharge controllers are interlocked to jet ink, the signal splitter outputs the predictive pulse waves to each of the plurality of ink discharge controllers, the ink discharge controller acquires position information of the ink jetting body by counting the number of inputs of the predictive pulse wave, the ink module transfer portion includes a module base in which the ink jetting body is mounted, an actuator driver configured to transfer the module base in one direction, and an ink module position controller configured to control a jetting position of ink by controlling the actuator driver to move the module base, the ink module position controller acquires position information of the module base from the encoder by interlocking the encoder, and the substrate transfer portion further includes a base controller configured to transfer the transfer object according to a predetermined work command.

According to the exemplary embodiment of the present invention, a signal splitter can split a movement signal to a plurality of ink discharge controllers by outputting a predictive pulse wave to an ink discharge controller based on the movement signal of an encoder and a digital speed value, a printing resolution can be improved by generating a more precise predictive pulse wave than a pulse wave of the encoder. Furthermore, it is possible to ignore a noise generated between the encoder and the signal splitter, and even if the pulse wave missed or overlapped, since the predictive pulse wave is generated, there is an effect of avoiding errors for a discharge timing of an ink jetting body.

The effect of the present invention is not limited to the foregoing effects, and those skilled in the art may clearly understand non-mentioned effects from the present specification and the accompanying drawings.

DETAILED DESCRIPTION

Figure 1:
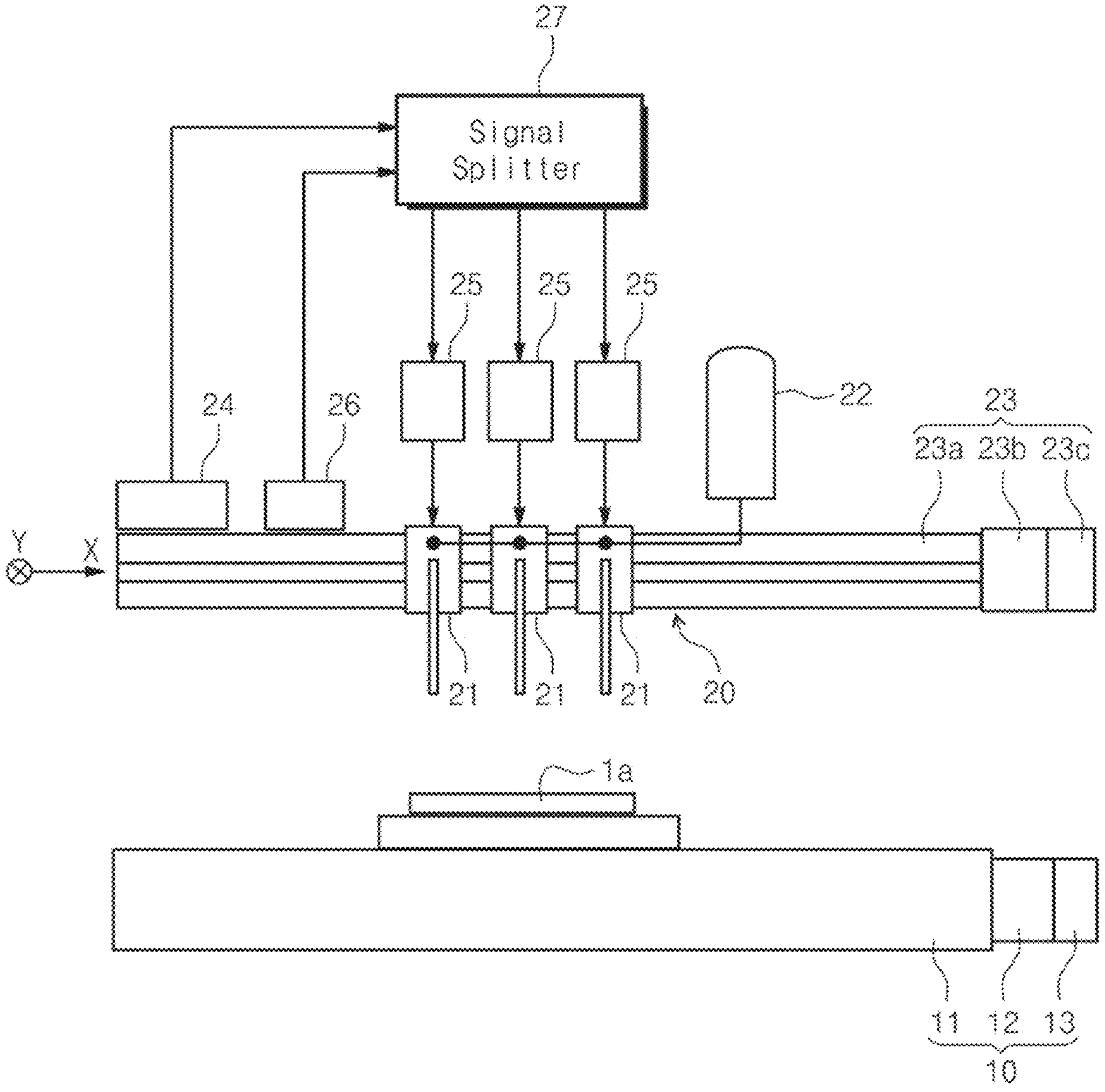
FIG. 1 is a structural view of a substrate processing device according to one embodiment of the present invention.

Hereinafter, an exemplary embodiment of the present invention will be described in detail with reference to the accompanying drawings so that those skilled in the technical field to which the present invention pertains may easily carry out the exemplary embodiment. In this case, unless explicitly stated to the contrary, the word “comprise,” “comprises” or “comprising” used throughout the specification will not be understood as the exclusion of the other elements but to imply the inclusion of the other elements. In addition, the term “ . . . portion” in the specification refers to a unit that processes at least one function or operation when describing electronic hardware or electronic software, and is considered to mean one part, function, use, point, or driving element when describing a machine device. The same or similar elements are assigned the same reference numerals irrespective of their reference numerals, and a redundant description thereof is omitted.

Figure 2:
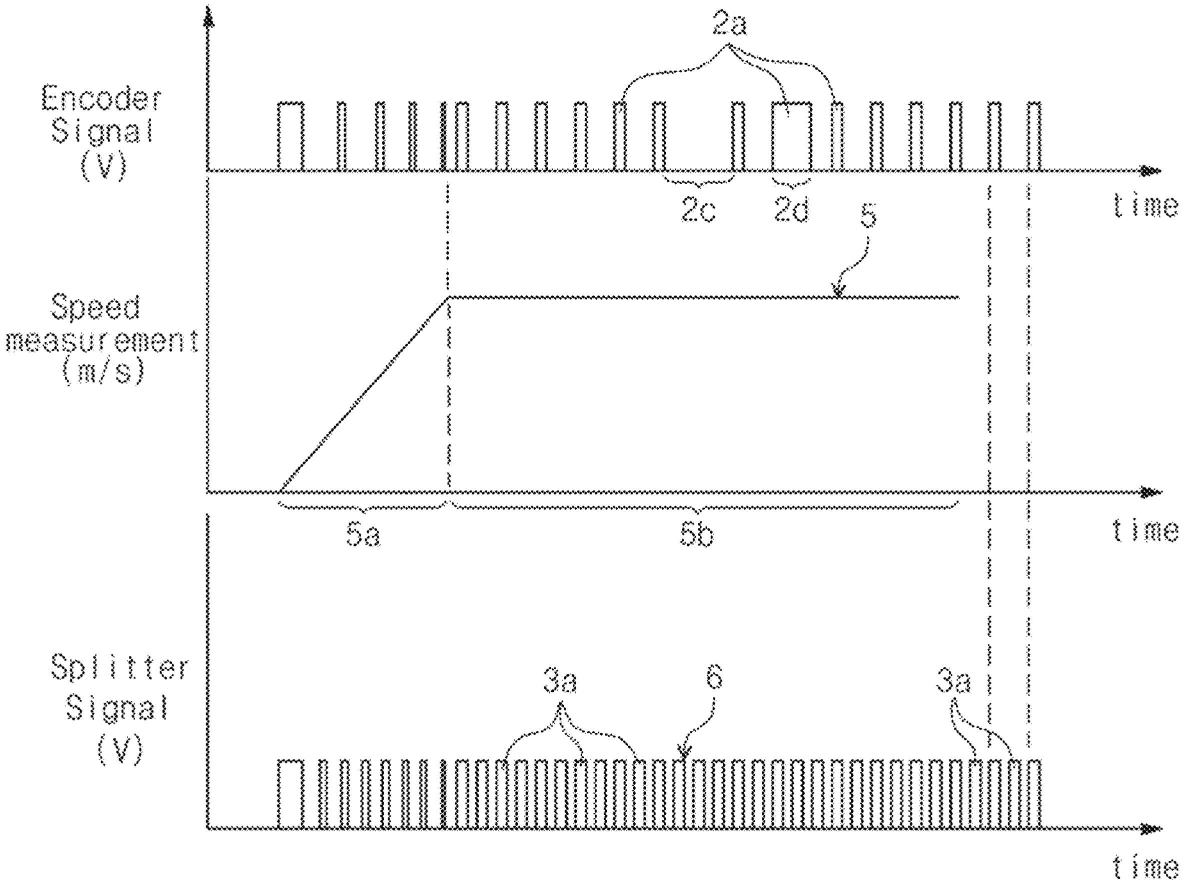
FIG. 2 is a graph comparing a pulse wave output from an encoder illustrated in FIG. 1 with a combined pulse wave output from a signal splitter.

FIG. 1 is a block diagram of a substrate processing device according to an embodiment of the present invention. FIG. 2 is a graph comparing pulse waves output from an encoder illustrated in FIG. 1, prediction pulse waves output from a signal splitter, and a speed profile previously stored in the signal splitter.

As illustrated in FIG. 1, the substrate processing device according to the exemplary embodiment of the present invention includes a substrate transfer portion 10 and a jetting system unit 20.

The substrate transfer portion 10 includes a transfer base 11 on which a transfer object 1*a* is seated, a transfer actuator driver 12 that transfers the transfer base 11 in one or more axes, and a base controller 13 that controls the transfer actuator driver 12. In this case, the transfer actuator driver 12 may be configured as a transfer device such as a linear motor or a linear actuator. In the present embodiment, the substrate transfer portion 10 will be exemplified as a uniaxial transfer device for transferring the transfer base 11 to one axis. Here, the transfer object 1*a* transferred by the substrate transfer portion 10 is composed of a display substrate printed by ink, and transfers the display substrate. However, in the present invention, the transfer object 1*a* transferred by the substrate transfer portion 10 is not limited to the display substrate, and may be implemented by various modifications such as a printed circuit board. Here, the substrate transfer portion 10 is disposed to cross an ink module transfer portion 23 described below. For example, when the substrate transfer portion 10 transfers the transfer object 1*a* to a Y axis on a plane based on the X axis and the Y axis, the ink module transfer portion 23 moves to the X axis and moves on the plane. In addition, the substrate transfer portion 10 may transmit position information on the Y-axis of the transfer object 1*a* by interlocking an ink discharge controller 25, and in this case, the position information on the Y-axis may be installed on the substrate transfer portion 10 and transmitted from an encoding device that provides the position information on the Y-axis. In addition, the base controller 13 transfers the transfer base 11 of the substrate transfer portion 10 according to a preset work command by interlocking the substrate transfer portion 10, and accordingly transfers the transfer object 1*a* seated on the transfer base 11. In this case, when the jetting system unit 20 advances an ink jetting command, the base controller 13 interrupts the transfer of the transfer object 1*a*, and some areas of the transfer object 1*a* are moved a certain distance after they are printed, and the next area is printed.

The jetting system unit 20 includes an ink jetting body 21, an ink supply portion 22, an ink module transfer portion 23, an encoder 24, an ink discharge controller 25, a speed measuring portion 26, and a signal splitter 27.

The ink jetting body 21 is formed by including a piezo element (not illustrated) and a head part (not illustrated) in which the piezo element is mounted and through which ink passes. The ink jetting body 21 is connected to the ink supply portion 22, and when ink supplied from the ink supply portion 22 flows into a flow path inside a head portion, the piezo element coupled to the head portion is driven to discharge the ink in the head portion. However, the configuration of the ink jetting body 21 in the present invention is not limited to a way to use the piezo device, and may be modified into various forms such as a type of heating the head portion. In this case, the ink jetting body 21 is mounted in a module base 23*a* to jet the ink while changing the jetting position. A plurality of the ink jetting body 21 may be provided and may be spaced apart from each other, and the plurality of the ink jetting body 21 simultaneously jets the ink on a printing surface of the transfer object 1*a*, thus shortening an ink application time.

The ink supply portion 22 pumps and supplies the ink to the ink jetting body 21 by interlocking the ink jetting body 21. In this case, depending on the process, the ink may be formed in various ways, such as a display RGB lightemitting layer ink, a conductive ink for wiring a substrate layer, a doping ink for doping a semiconductor, and an insulating ink for forming an insulating layer.

The ink module transfer portion 23 includes the module base 23*a* in which an ink jetting body 21 is mounted, an actuator driver 23*b* that transfers the module base 23*a* in one direction, and an ink module position controller 23*c* that controls the actuator driver 23*b* and controls the jetting position of the ink by moving the module base 23*a*. In this case, the actuator driver 23*b* may be implemented with a linear motor or a linear actuator that transfers the module base 23*a* in one or more axes by interlocking the module base 23*a*. In the exemplary embodiment of the present invention, the ink module transfer portion 23 is described as a uniaxial transfer device for transferring the module base 23*a* to one axis. Here, in the ink module transfer portion 23, a plurality of ink jetting bodies 21 may be disposed to be spaced apart from each other. In addition, the ink module position controller 23*c* receives a pulse wave 2*a* from the encoder 24, acquires the position information of the module base 23*a*, and controls the position of the ink jetting body 21 by controlling the actuator driver 23*b* based on the position information of the encoder 24.

The encoder 24 is mounted around the ink module transfer portion 23 and detects a linear movement distance of the ink jetting body 21. In this embodiment, the encoder 24 outputs the pulse wave 2*a*, which is a signal for each movement distance, to the signal splitter 27 for each unit movement distance of the ink module transfer portion 23. For example, the encoder 24 may output one pulse wave 2*a* when the ink module transfer portion 23 moves every 100 nm, and in this case, an interval between the pulse waves 2*a* output from the encoder 24 corresponds to 100 ns when a transfer speed of the ink module transfer portion 23 is 1 m/s. In this case, with an increase in the transfer speed of the ink module transfer portion 23, the interval between the pulse waves 2*a* output from the encoder 24 becomes shorter.

A plurality of ink ejection controllers are provided and connected to each of the ink jetting bodies 21, and control a jetting timing of the ink discharged from the ink jetting bodies 21 by interlocking each of the ink jetting bodies 21. In this case, the ink discharge controller 25 receives a predictive pulse wave 3*a* formed by prediction from the signal splitter 27 to adjust the jetting timing of the ink, acquires the position of the ink jetting body 21 through the received predictive pulse wave 3*a*, and transmits an ink discharge command to the ink jetting body 21 such that the ink may be jetted to a position which the ink has to be jetted.

The speed measuring portion 26 includes a speed sensor (not illustrated) installed in the ink module transfer portion 23 to sense a speed physical amount proportional to the moving speed of the ink jetting body 21, and a speed value conversion module (not illustrated) that converts the speed physical amount measured by the speed sensor into a digital speed value. In this case, the speed sensor may be transformed and implemented into various speed sensors such as an acceleration sensor, a laser displacement sensor, or an encoding type sensor. The speed measuring portion 26 converts the moving speed of the ink jetting body 21 moved by the ink module transfer portion 23 into the digital speed value and transmits the converted speed to the signal splitter 27.

The signal splitter 27 is connected between the encoder 24 and a plurality of ink discharge controllers 25, records intervals of pulse waves 2*a*, which are signals for each movement distance input from the encoder 24, and receives and records a digital speed value by interlocking the speed measuring portion 26. In addition, the signal splitter 27 distinguishes whether the digital speed value belongs to an equivalent acceleration section 5*a* or an equivalent speed section 5*b*, and outputs the predictive pulse wave 3*a* to the ink discharge controller 25 based on an initial value of the pulse wave 2*a* input from the encoder 24 depending on the state of the speed section. For example, when the ink jetting body 21 moves at an equivalent speed of 1 m/s by the ink module transfer portion 23 to generate the pulse waves 2*a* at 100 ns intervals in the encoder 24, the signal splitter 27 generates the predictive pulse waves 3*a* in which another pulse wave 2*b* added between the pulse waves 2*a* of the encoder 24 so as to generate the pulse waves 2*a* at 100 ns intervals, and outputs the same to the ink discharge controller 25. In this case, the ink discharge controller 25 receiving the predictive pulse waves 3*a* counts the number of inputs of the predictive pulse waves 3*a* and acquires position information of the ink jetting body 21. In the exemplary embodiment, the predictive pulse wave 3*a* implements twice the resolution of the pulse wave 2*a* of the encoder 24, thereby doubling the accuracy of the printer. However, in the present invention, the resolution of the predictive pulse wave 3*a* is not limited to twice, and a more accurate resolution can be implemented by varying the multiple as needed. On the other hand, when the ink jetting body 21 moves at an equivalent acceleration of 10 $m/s^2$ by the ink module transfer portion 23 to generate the pulse wave 2*a* for the first 100 ns interval in the encoder 24, and the interval of the pulse wave 2*a* decreases in proportion to the slope of the equivalent acceleration, the signal splitter 27 outputs the predictive pulse waves 3*a* for the first 100 ns interval but outputs the predictive pulse waves 3*a* whose interval decreases by a factor of two times in proportion to the slope of equal acceleration, to the ink discharge controller 25. In this case, the ink discharge controller 25 receiving the predictive pulse wave 3*a*, which decreases proportionally according to the slope of the equivalent acceleration, counts the number of inputs of the predictive pulse wave 3*a* and acquires the position information of the ink jetting body 21.

In this way, since the signal splitter 27 transmits a high-resolution predictive pulse wave 3*a* to the ink discharge controller 25 instead of the pulse wave 2*a* output from the encoder 24, the signals of the encoder 24 can be split to the plurality of ink discharge controllers 25, and a printing resolution may be improved by the predictive pulse waves 3*a*, which are more precise than the pulse waves 2*a* of the encoder 24. Further, since a noise generated between the encoder 24 and the signal splitter 27 can be ignored, an error in a discharge timing of the ink jetting body 21 does not occur. In addition, since the signal splitter 27 outputs the predictive pulse wave 3*a* predicted instead of the pulse wave 2*a* output from the encoder 24, even if an omission section 2*c* in which the pulse wave 2*a* is omitted or an overlapping section 2*d* in which the pulse wave 2*a* overlaps occurs in the encoder 24, this can be supplemented.

On the other hand, as mentioned above, the signal splitter 27 may use a pre-stored speed profile 5 and a predictive pulse wave profile 6 in implementing a manner of generating the predictive pulse wave 3*a* based on the interval and digital speed value output from the encoder 24. Here, the pre-stored speed profile 5 corresponds to data driven at an equivalent speed and equivalent acceleration previously set during the movement of the ink jetting body 21, and in this case, the pre-stored speed profile 5 is divided into an equivalent acceleration section 5*a* and an equivalent speed section 5*b*. Here, the signal splitter 27 further stores and uses the predictive pulse wave profile 6 to correspond to the speed profile 5. For example, if the digital speed value of the ink jetting body 21 corresponds to the equivalent speed section 5*b* moving at an equivalent speed of 1 m/s within the speed profile 5, the signal splitter 27 generates the predictive pulse wave 3*a* corresponding to the equivalent speed section 5*b* at a more precise interval than the pulse wave 2*a* of the encoder 24. Likewise, when the digital speed value of the ink jetting body 21 corresponds to the equivalent acceleration section 5*a* within the speed profile 5, the signal splitter 27 generates the predictive pulse wave 3*a* corresponding to the equivalent acceleration section 5*a* within the predictive pulse wave profile 6. In this case, in the equivalent acceleration period 5*a*, a predictive pulse wave 3*a* having higher resolution than the pulse wave 2*a* output from the encoder 24 may be generated.

Therefore, since the signal splitter 27 transmits the predictive pulse wave 3*a* predicted according to the speed to the ink discharge controller 25 using the pre-stored speed profile 5 and the predictive pulse wave profile 6, the signal splitter 27 can split the signals of the encoder 24 to the plurality of ink discharge controllers 25. Further, it is possible to improve the printing resolution by generating the predictive pulse waves 3*a* that are more precise than the pulse waves 2*a* of the encoder 24, and noise generated between the encoder 24 and the signal splitter 27 may be ignored. Furthermore, even if the pulse wave 2*a* is omitted from the encoder 24, since the predictive pulse wave 3*a* is generated, no errors can occur in the discharge timing of the ink jetting body 21.

Hereinafter, a control method of the substrate processing device as described above will be described.

Figure 3:
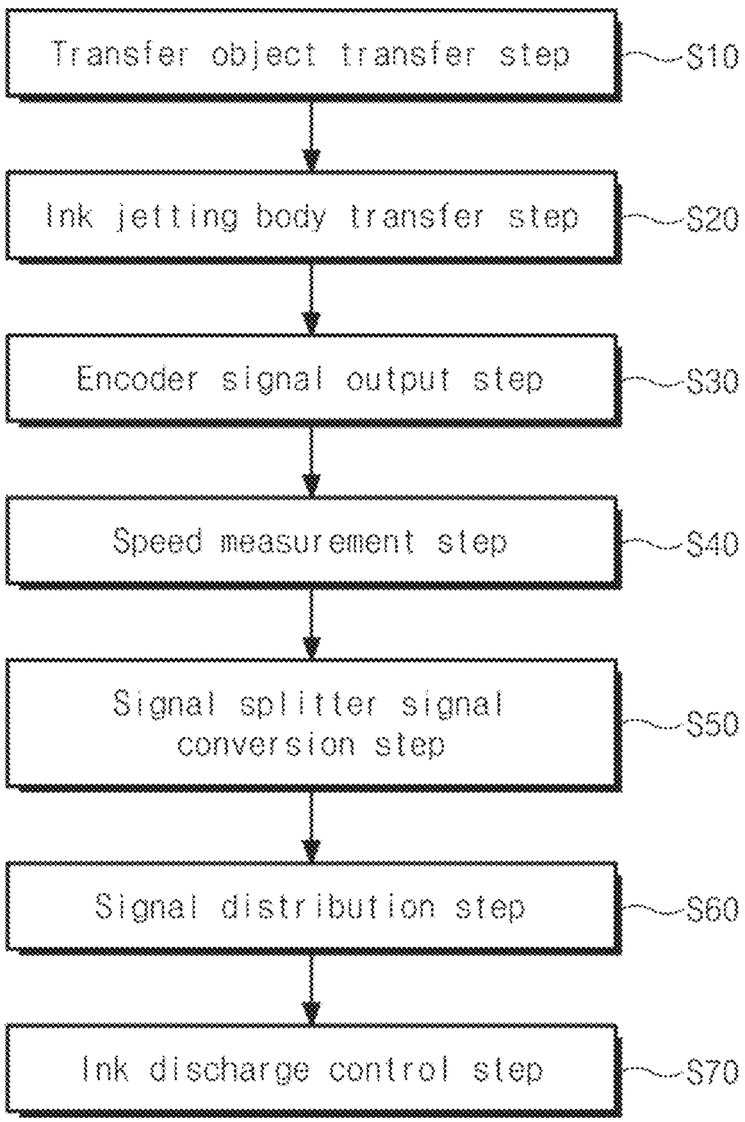
FIG. 3 is a flowchart of a control method for a substrate processing device according to one embodiment of the present invention.

FIG. 3 is a flowchart of a control method for a substrate processing device according to one embodiment of the present invention.

Referring further to FIG. 3, the control method for a substrate processing device according to one embodiment of the present invention includes a transfer object transfer step S10, an ink jetting body transfer step S20, an encoder signal output step S30, a speed measurement step S40, a signal splitter signal conversion step S50, a signal distribution step S60, and an ink discharge control step S70.

First, in the transfer object transfer step S10, the display substrate, which is the transfer object 1*a* seated on the substrate transfer portion 10, is transferred by a preset command from the base controller 13, and then the display substrate, which is the transfer object 1*a*, is placed at a specific position in the middle of the lower part of the ink jetting body 21.

Next, in the ink jetting body transfer step S20, the ink module transfer portion 23 transfers the ink jetting body 21 disposed on an upper part of the display substrate.

Next, in the encoder signal output step S30, the pulse wave 2*a*, which is a movement signal, is output for each movement distance when the ink jetting body 21 moves. For example, as mentioned above, in the encoder 24, since the ink module transfer portion 23 is driven, one pulse wave 2*a* is output when the ink jetting body 21 moves every 100 nm.

Next, in the speed measurement step S40, the speed measuring portion 26 measures the moving speed of the ink jetting body 21 and converts the measured speed into a digital speed value, and transmits the converted digital speed value to the signal splitter 27.

Next, in the signal splitter signal conversion step S50, the signal splitter 27 records the intervals between the pulse waves 2*a*, which are signals for each movement distance input from the encoder 24, receives and records the digital speed value by interlocking the speed measuring portion 26, distinguishes whether the digital speed value belongs to the equivalent acceleration section 5*a* or the equivalent speed section 5*b* through the digital speed value, and generates the predictive pulse wave 3*a* based on an initial pulse wave input from the encoder 24 in each speed section. For example, as mentioned above, when the ink jetting body 21 moves at the equivalent speed of 1 m/s to generate the pulse wave 2*a* for an interval of 100 ns in the encoder 24, the signal splitter 27 generates the predictive pulse waves at 100 ns intervals or precise predictive pulse waves by adding other pulse waves 2*a* between the pulse waves 2*a* of the encoder 24. When the ink jetting body 21 moves at the equal acceleration of 10 $m/s^2$, the signal splitter 27 generates the predictive pulse waves 3*a* whose interval is further reduced than the pulse waves 2*a* of the encoder 24 in proportion to the slope of the equivalent acceleration.

In addition, in the signal splitter signal conversion step S50, the predictive pulse waves 3*a* may be generated using the pre-stored speed profile 5 and the predictive pulse wave profile 6. For example, when the digital speed value of the ink jetting body 21 corresponds to the equivalent speed section 5*b* moving at the equivalent speed of 1 m/s within the speed profile 5, the signal splitter 27 generates the predictive pulse waves 3*a* corresponding to the equivalent speed section 5*b* within the predictive pulse wave profile 6, and when the digital speed value of the ink jetting body 21 corresponds to the equivalent acceleration section 5*a* within the speed profile 5, the signal splitter 27 generates the predictive pulse waves 3*a* corresponding to the equivalent acceleration section 5*a* within the predictive pulse wave profile 6.

Next, in the signal distribution step S60, the signal splitter 2 outputs and splits the predictive pulse waves 3*a* to each of the ink discharge controllers 25, and confirms the position of the ink jetting body 21 based on the interval and counting number of the predictive pulse waves 3*a* in the ink discharge controller 25 that received the predictive pulse waves 3*a*.

Next, in the ink discharge control step S70, the position information of the ink jetting body 21 is adjusted and set by the counting number of the predictive pulse waves 3*a* received from the ink discharge controller 25. When the corresponding position corresponds to a position where the ink will be jetted, a jetting command is transmitted from the ink jetting body 21 so as to jet the ink, and when the corresponding position does not correspond to a position where the ink will not be jetted, the jetting command is not transmitted.

As described above, in the substrate processing device and the control method of the substrate processing device according to an embodiment of the present invention, the signal splitter 27 can output the predictive pulse wave 3*a* to the ink discharge controller 25 based on the movement signal and the digital speed value of the encoder 24, thereby distributing the movement signal to the plurality of ink discharge controllers 25, and the printing resolution can be improved by generating the predictive pulse waves 3*a* that are more precise than the pulse waves 2*a* of the encoder 24. Furthermore, it is possible to ignore the noise generated between the encoder 24 and the signal splitter 27, and even if the pulse wave 2*a* is missed or overlapped in the encoder 24, since the predictive pulse waves 3*a* can be generated to avoid the errors for the discharge timing of the ink injection body 21.

The foregoing detailed description illustrates the present invention. In addition, the above description shows and describes the exemplary embodiments of the present invention, and the present invention may be used in various other combinations, modifications, and environments. That is, changes or modifications are possible within the scope of the concept of the invention disclosed herein, the scope equivalent to the written disclosure, and/or within the scope of skill or knowledge in the art. The foregoing exemplary embodiment describes the best state for implementing the technical spirit of the present invention, and various changes required in specific application fields and uses of the present invention are possible. Accordingly, the detailed description of the invention above is not intended to limit the invention to the disclosed exemplary embodiment. In addition, the appended claims should be construed to include other exemplary embodiments as well.

What is claimed is:

1. A substrate processing device, comprising:

a substrate transfer portion in which a transfer object is seated; and a jetting system unit including an ink jetting body configured to jet ink to the transfer object from an upper surface of the substrate transfer portion and print the transfer object, an ink module transfer portion configured to transfer the ink jetting body, an ink discharge controller configured to control an ink jetting timing of the ink jetting body by interlocking the ink jetting body, a speed measuring portion configured to specify a moving speed of the ink jetting body, a signal splitter configured to receive the moving speed of the ink jet jetting body by interlocking the speed measuring portion and transmit a predictive movement signal predicted according to the moving speed to the ink discharge controller and an encoder disposed around the ink module transfer portion and configured to output a movement signal for each unit movement distance of the ink module transfer portion, wherein the signal splitter is configured to generate predictive pulse waves respectively based on an initial value of the movement signal output from the encoder and transmit the predictive pulse waves to the ink discharge controller.

2. The substrate processing device of claim 1, wherein the signal splitter uses a speed profile for a movement of the ink jetting body and a predictive pulse wave profile configured so as to generate & predictive pulse waves according to a speed of the speed profile.

3. The substrate processing device of claim 2, wherein the speed profile is divided into an equivalent acceleration section and an equivalent speed section, and in the equivalent speed section, the predictive pulse waves at the same intervals are transmitted to the ink discharge controller.

4. The substrate processing device of claim 3, wherein in the equivalent acceleration section, a respective one of the predictive pulse waves whose interval narrows in proportion to a slope of the equivalent acceleration section is transmitted to the ink discharge controller.

5. The substrate processing device of claim 2, wherein a plurality of ink jetting bodies and a plurality of ink discharge controllers are interlocked to jet ink, and the signal splitter outputs the predictive pulse waves to each of the plurality of ink discharge controllers.

6. The substrate processing device of claim 2, wherein the ink discharge controller acquires position information of the ink jetting body by counting a number of inputs of a respective one of the predictive pulse waves.

7. The substrate processing device of claim 1, wherein the ink module transfer portion includes a module base in which the ink jetting body is mounted, an actuator driver configured to transfer the module base in one direction, and an ink module position controller configured to control a jetting position of the ink by controlling the actuator driver to move the module base.

8. The substrate processing device of claim 7, wherein the ink module position controller acquires position information of the module base from the encoder by interlocking the encoder.

9. The substrate processing device of claim 1, wherein the substrate transfer portion further includes a base controller configured to transfer the transfer object according to a predetermined work command.

10. A substrate processing device, comprising:

a substrate transfer portion in which a transfer object is seated; and a jetting system unit including an ink jetting body configured to jet ink to the transfer object from an upper surface of the substrate transfer portion and print the transfer object, an ink module transfer portion configured to transfer the ink jetting body, an ink discharge controller configured to control an ink jetting timing of the ink jetting body by interlocking the ink jetting body, a speed measuring portion configured to specify a moving speed of the ink jetting body, and a signal splitter configured to receive the moving speed of the ink jet-jetting body by interlocking the speed measuring portion and transmit a predictive movement signal predicted according to the moving speed to the ink discharge controller, wherein the jetting system unit further includes an encoder disposed around the ink module transfer portion and configured to output a movement signal for each unit movement distance of the ink module transfer portion, the signal splitter is configured to generate predictive pulse waves respectively based on an initial value of the movement signal output from the encoder and transmits the predictive pulse waves to the ink discharge controller, the signal splitter is configured to uses a speed profile for a movement of the ink jetting body and a predictive pulse wave profile configured so as to generate the predictive pulse waves predicted according to the moving speed of the speed profile, the speed profile is divided into an equivalent acceleration section and an equivalent speed section, and in the equivalent speed section, the predictive pulse waves at same intervals are transmitted to the ink discharge controller, in the equivalent acceleration section, a respective one of the predictive pulse waves whose interval narrows in proportion to a slope of the equivalent acceleration section is transmitted to the ink discharge controller, a plurality of the ink jetting bodies and a plurality of the ink discharge controllers are interlocked and configured to jet the ink, the signal splitter is configured to outputs the predictive pulse waves to each of the plurality of ink discharge controllers, the ink discharge controller is configured to acquires position information of the ink jetting body by counting a number of inputs of a respective one of the predictive pulse waves, the ink module transfer portion includes a module base in which the ink jetting body is mounted, an actuator driver configured to transfer the module base in one direction, and an ink module position controller configured to control a jetting position of the ink by controlling the actuator driver to move the module base, the ink module position controller is configured to acquires the position information of the module base from the encoder by interlocking the encoder, and the substrate transfer portion further includes a base controller configured to transfer the transfer object according to a predetermined work command.

* * * * *